Aug. 22, 1961   W. F. HUCH ET AL   2,997,259
BALLOON WEIGH-OFF AND LAUNCHING MEANS AND METHOD
Filed March 24, 1958   2 Sheets-Sheet 1
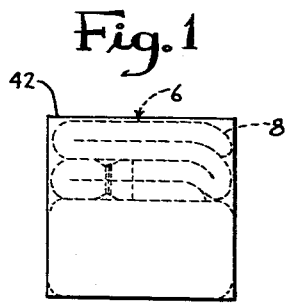
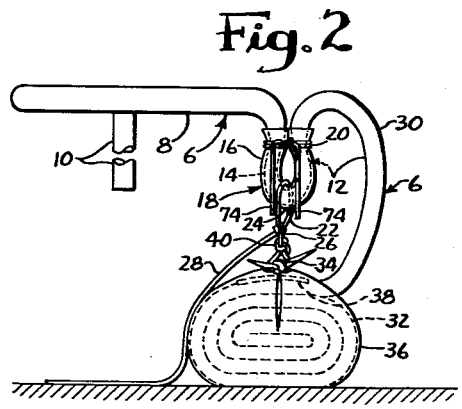
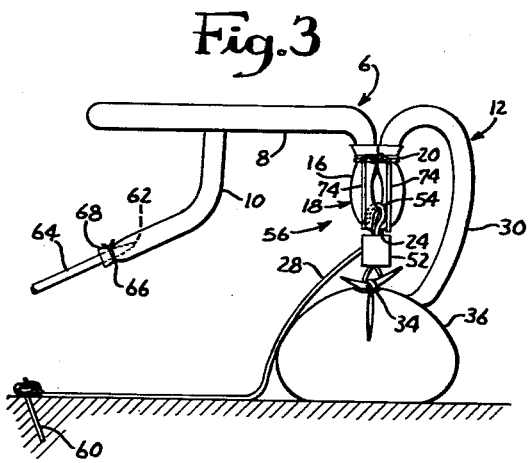
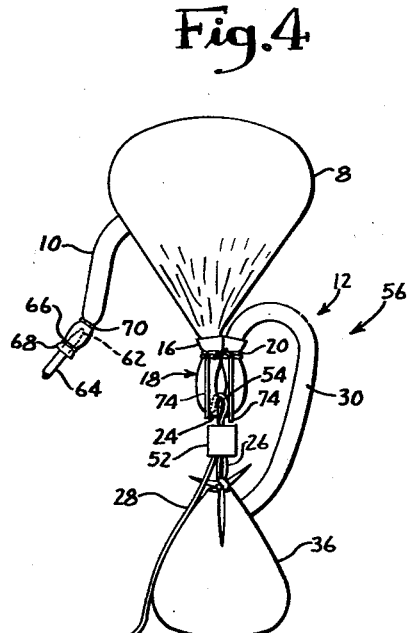
INVENTORS
WILLIAM F. HUCH
EDWARD P. NEY
JOHN R. WINCKLER
by: J. A. O'Connell
Louis Sheldon   ATTYS.

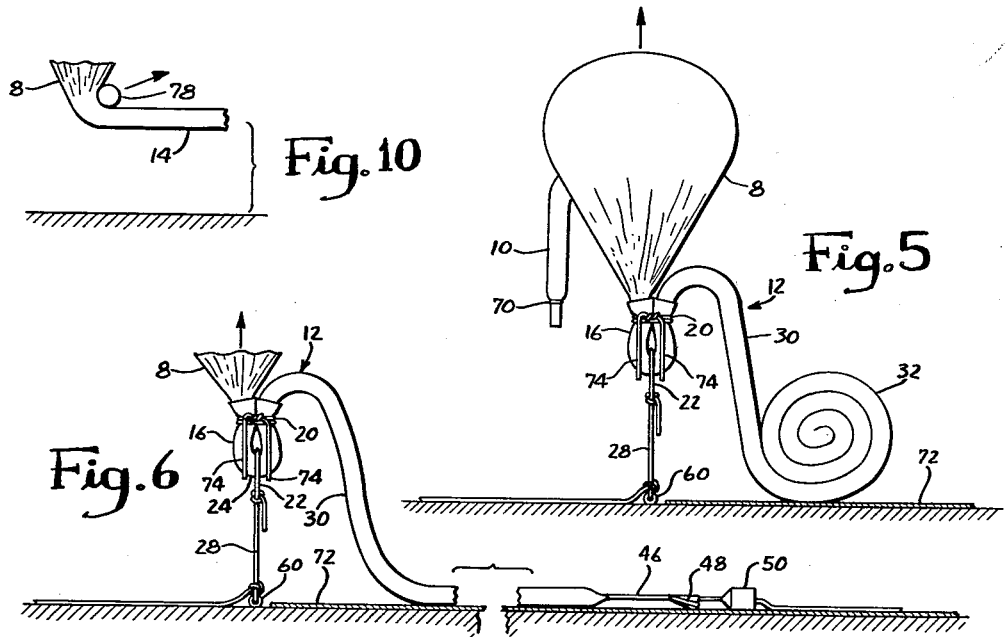
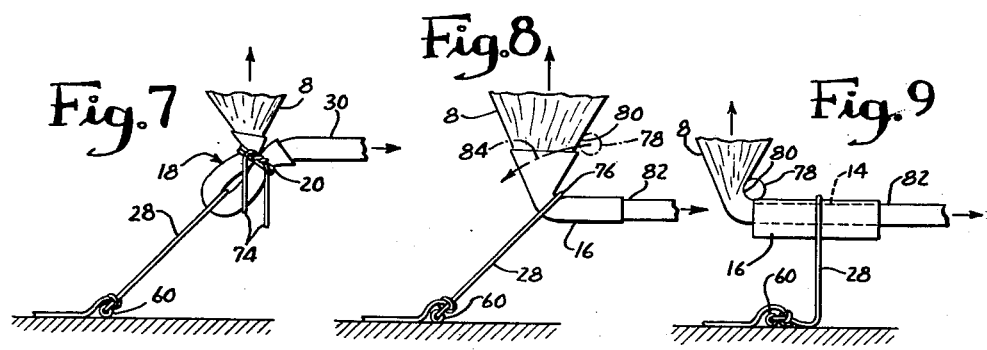
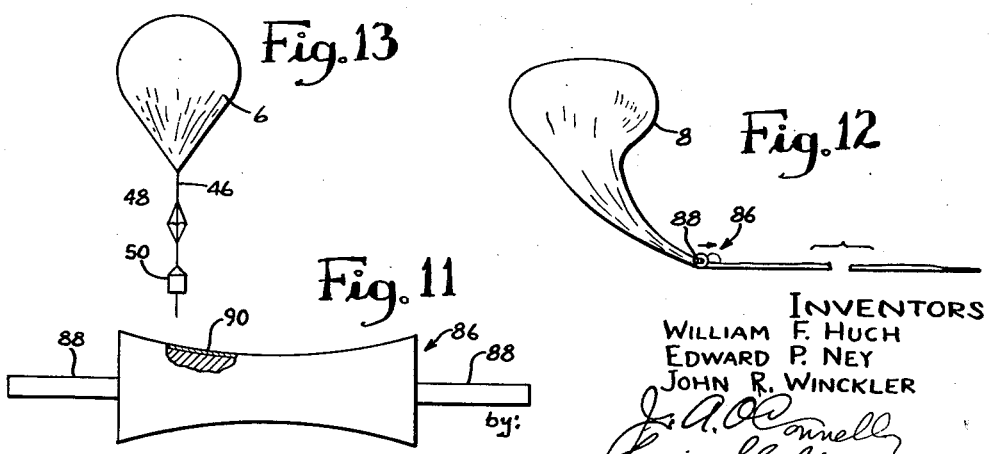

United States Patent Office
2,997,259
Patented Aug. 22, 1961

2,997,259
BALLOON WEIGH-OFF AND LAUNCHING
MEANS AND METHOD
William F. Huch, St. Paul, and Edward P. Ney and John R. Winckler, Minneapolis, Minn., assignors, by mesne assignments, to the United States of America as represented by the Secretary of the Navy
Filed Mar. 24, 1958, Ser. No. 723,617
9 Claims. (Cl. 244—31)

This invention relates to improvements in the weigh-off and launching of high altitude balloons.

The term "balloon" as used herein embraces the assembly of the balloon envelope and the load items to be launched therewith.

Weigh-off of a balloon involves inflating a balloon envelope with lift gas and stopping the inflation when the lift reaches a value sufficient to enable the balloon to be buoyantly supported with a predetermined free lift. The volume of gas needed at the ground is a small fraction of the gross volume of the balloon envelope. In the past the determination of when to terminate inflation has been attempted in various unsatisfactory ways. One method required calculations based on the pressure in the lift gas supply container. Another involved inflating in steps and measuring the lift at each step with a launching platform scale or other mechanism until the inflation was completed. These methods suffered from inaccuracies introduced by windloading and other factors. Calculation of the free lift quantity of gas is dependent on gas purity, gage accuracies, and correct gas cylinder (bottle) volumes, and assumes no hose leakage. Platform scale weigh-off accuracy is dependent on, among other things, the vertical components of the windloadings on the balloon bubble at the time of weigh-off, and calibration of the platform scale. Moreover, the old method of releasing a balloon envelope suddenly, as from a platform, subjects the envelope to shock which can result in envelope failure when the envelope is made of delicate film such as thin Mylar or polyethylene.

It is an object of the invention to provide a simple, effective and accurate method of balloon weigh-off.

Another object is to provide a gentle technique of putting a large delicate balloon envelope into the air in winds substantially as high as 12 miles per hour at a site unprotected from the wind.

A further object is to provide simplified apparatus for weighing off and launching a balloon.

Further objects and advantages of the invention will appear as the description proceeds.

The invention will be better understood on reference to the following description and the accompanying drawings, wherein:

FIG. 1 is an elevational view showing an uninflated balloon envelope and certain connected parts packed in a protective container in which they are adapted to be delivered to the weigh-off and launching site.

FIG. 2 is an elevational view of the container contents arranged in preparation for weigh-off.

FIG. 3 is similar to FIG. 2 but includes a dummy weight, and shows the arrangement as inflation and weigh-off are about to start.

FIG. 4 is similar to FIG. 3 except that the weigh-off is complete.

FIG. 5 differs from FIG. 4 in that the inflation hose and the pouch are removed, the safety anchor line snubbed, a ground cloth provided, and the wadded lower part of the envelope is about to be extended downwind along the cloth.

FIG. 6 is similar to FIG. 5 but shows the lower part of the envelope fully extended and the load items attached.

FIG. 7 shows a portion of the structure of FIG. 6 but with the parts so arranged as to preclude slipping of the anchor line along the envelope when the loop is opened.

FIG. 8 is similar to FIG. 7 except that the loop is open.

FIG. 9 is similar to FIG. 8 except that the crew member's arm, instead of the anchor line, restrains the base of the bubble.

FIG. 10 is similar to FIG. 9 except that the anchor line and choker sheet are removed and the restraint on the bubble base is about to be relaxed.

FIG. 11 shows a roller which may be used in lieu of the crew member's arm to restrain the bubble base.

FIG. 12 shows the roller in the process of releasing the bubble to allow it to soar at its climbing velocity.

FIG. 13 shows diagrammatically the balloon in flight.

Referring now more particularly to the drawings, disclosing an illustrative embodiment of the invention, there is shown at 6 an uninflated balloon film envelope having an upper part 8 which is to serve as the inflation bubble, an inflation tube 10 attached thereto, and a lower part 12 whose upper portion 14 is tightly wrapped in a sheet 16, here sometimes also called a choker, which is doubled on itself to provide a loop 18 whose ends are tied as by a nylon or other suitable cord 20 preferably with a square knot. A similar cord 22 is linked with and tied adjacent the bight 24 of the loop 18 to provide a pair of lines 26 and 28 of preferably unequal length. The remainder 30 of the lower part 12 is for the most part accordion-folded or rolled into compact wadded form as indicated at 32 (FIG. 2) and placed on a substantially square protective sheet whose corners are then knotted together as at 34 to form a pouch 36. A protective liner 38 is preferably placed over the wad 32. The shorter line 26 is linked with the knot means 34 and tied to itself as at 40 to locate the pouch 36 close to the loop 18. This assembly is placed in a shipping container 42 (FIG. 1) such as a box or bag and is thus received from the manufacturer and brought to the launching site. The tare weight, i.e., the combined weight of the choker 16, cords 20 and 22, pouch 36, and liner 38 are predetermined and this information furnished by the manufacturer.

Weigh-off in accordance with the invention is accomplished before the load line 46, parachute 48, gondola 50, and other load items (not shown) are attached. Accordingly the weigh-off requires that one or more dummy weights, here for convenience considered and shown as a single slug 52, be temporarily suspended from the envelope 6 and be of such weight that the combined value of such dummy weight and the tare weight shall equal the sum of the combined weight of the load items and the value of the free lift. The tare weight, the free lift, and the weight of the load items are of course predetermined, so that the weight of the slug 52 is readily predetermined.

At the launching site the container 42 is discarded and the slug 52 suspended from the loop 18 in any suitable manner, as by a hook 54, to provide with the envelope 6 and the parts connected thereto an assembly or unit 56 (FIG. 3). The line 28 may then be anchored to a ground stake 60 with slack in the line and is to serve as a safety anchor line. With the pouch 36 resting on the ground and the part of the envelope which is outside of the pouch held off the ground by one or more members of the launching crew to avoid damage by abrasion, the nozzle 62 of a hose 64 from a helium or other lift gas cylinder or bank of cylinders (not shown) is temporarily secured as at 66 in the free end 68 of the inflation tube 10, and inflation is begun. When the bubble part 8 contains sufficient lift gas to just lift the unit 56 off the ground, the inflation is stopped and the unit, under the control of one or more crew members, is allowed to float a short distance with the wind (the safety anchor line 28 being slack) and an observation is made as to whether the unit settles, showing an insufficient inflation, or drifts level, showing the desired inflation.

When the desired inflation is achieved, the ground wind has no effect on the lift, inasmuch as the unit 56 is floating. The weigh-off methods heretofore used had to cope with an inaccuracy introduced by the vertical component of the ground wind acting on the bubble due to the fact that the bubble was not free to float with the wind, but was anchored at its base.

When the inflation is completed, and while the loop 18 is temporarily held, either by a crew member or by temporarily attached auxiliary weights (not shown) or by a pull on the safety anchor line 28, to restrain the bubble 8, the inflation tube 10 is tied closed as at 70 above the nozzle 62, the hose 64 is released and removed, the safety anchor line is snubbed to hold the loop within about four feet from the ground, with the line extending more or less vertically (FIG. 5), a ground cloth 72 is laid out downwind from the bubble, and the pouch 36 and slug 52 disconnected from the loop. The envelope wad 32 is now extended or unrolled downwind along the ground cloth 72, and the load items are attached (FIG. 6). Then tension is applied by one or more of the crew members or by a truck (not shown) to the load line 46 (while the load items are hand-held off the ground cloth 72) to position and maintain the safety line 28 and the loop 18 at approximately 45° to the ground, the uninflated part adjacent and downwind from the loop being substantially horizontal so that this tension and the bubble lift are substantially equal (FIG. 7). The choker cord 20 is now untied and the ends 74 of the cord allowed to slip through the operator's hand so that the ends of the loop 18 separate gradually, the balloon then being in effect choked at the upper end 76 of the safety line 28 (FIG. 8). With the anchor line 28 at the 45° angle, this line at 76 will not slip.

At this stage a crew member places his arm, shown diagrammatically at 78 (FIG. 8), across the downwind side of the envelope just above the choker sheet 16, as at 80 (or just below the choker sheet, as at 82), and pulls upwind and toward the ground, as indicated at 84, until the safety anchor line 28 is slack (FIG. 9), whereupon a crew member detaches the line and choker 16 from the envelope. Then, with a gradually accelerated reverse motion, the arm 78 is relaxed and the envelope released, allowing the balloon to take off. If the wind is brisk, placing the arm 78 at 80 rather than at 82 is advisable in order to prevent the envelope portion between the positions 80 and 82 from spreading and thus acting as a sail area before the arm pull is relaxed.

An alternative method which may be employed at the stage indicated in FIG. 8 involves the use of a metal or other suitable roller 86 (FIGS. 11 and 12) instead of the crew member's arm. The roller 86 has stub shaft ends 88 and is in the form of a spool having an envelope-protecting covering 90 of knitted nylon or other suitable soft fabric. The shaft ends 88 are held by two men, one at each side of the envelope. On removal of the safety anchor line 28 and choker 16, these two men roll the roller 86 downwind faster and faster over the uninflated part of the envelope to initiate shock-free release of the balloon. When the roller 86 reaches a position somewhat ahead of the adjacent part of the envelope which is rising with the bubble, i.e., when the bubble becomes free to rise at its climbing velocity, one of the men tosses his end of the roller upward off the envelope fabric and toward the other side and the other man releases his end of the roller to allow it to drop to the ground free of the envelope, allowing the balloon to gradually rise so that it is gently launched.

In cases where the free lift is about 50 pounds or more, the roller 86 is more suitable than the crew member's arm for the purpose just noted.

The envelope material is preferably polyethylene or Mylar film having a thickness compatible with lightness and strength and anywhere from somewhat over .001" to as little as .00025", the minimum presently commercially available. The choker 16 may comprise a nylon film sheet covered with a tough cloth sheet if desired.

The bubble should be of a size substantially only sufficient to contain the volume of lift gas needed to lift the gross weight of the balloon with a predetermined free lift, so that at launching the inflated bubble has a natural shape similar to that of a pear-shaped type of toy top to minimize sail area and hence turbulence, without undue strain on the envelope film. The position of the base of the bubble having a natural hydrostatic shape and affording the desired free lift can be determined fairly accurately, the method of so doing forming no part of the invention.

The envelope may be of the vented or unvented type.

Although a preferred embodiment has been described in some detail, it should be regarded as an example of the invention and not as a restriction or limitation thereof as changes may be made in the construction and arrangement of the parts or the method without departing from the spirit and scope of the invention.

We claim:

1. A method of weighing off and launching a balloon which is to have a predetermined free lift and carry a predetermined load, comprising the steps of temporarily applying to an uninflated unloaded balloon envelope a downward force equal to the sum of the free lift and the weight of the load to be launched with the envelope, inflating the upper part of the envelope with lift gas into a bubble until the downwardly forced envelope is just buoyantly supported, tethering the envelope at the base of the bubble, extending the remainder of the envelope downwind from the bubble, removing the force, attaching the load to the envelope, replacing the tether by a movable restraint, accelerating the restraint downwind over the downwind-extending portion of the envelope until the bubble has reached climbing velocity, and removing the restraint.

2. A method of launching a balloon whose envelope has a tethered inflation bubble from the elevated base of which the adjacent portion of the remainder of the envelope extends substantially horizontally downwind, comprising the steps of applying a restraint to the base of the bubble, untethering the bubble, imparting to the restraint a gradually accelerated downwind motion until the bubble attains its climbing velocity, and then removing the restraint.

3. In a structure of the class described, a balloon film envelope, and means closing an intermediate tubular part of the envelope to block flow of gas through said part and provide above said part a receptacle for inflation gas, said means comprising an envelope-film-protecting sheet tightly wrapped in tubular form about and compacting said part, the ends of said part so compacted being secured together to provide a loop for suspending a temporary load.

4. A balloon film envelope having an inflation bubble having a predetermined free lift and an uninflated gathered loaded lower portion extending downwind from the base of the bubble, the bubble being entirely airborne and holding the adjacent part of the envelope elevated above the ground, and a roller on and extending substantially horizontally entirely across the envelope at the base and movable downwind along the gathered portion, the roller having stub shaft ends extending beyond the respective sides of the gathered envelope portion, the roller having a soft covering which will not injure the film.

5. In a method of weighing off and launching a balloon, the steps of temporarily closing an upper intermediate portion of a gathered unloaded uninflated balloon film envelope to provide thereabove a receptacle for confining the inflation gas, exerting on the receptacle a downward force equal to the sum of the predetermined free lift and the weight of the load to be launched with the envelope, bunching the remainder of the envelope adjacent the receptacle, inflating the receptacle with lift gas, stopping the inflation when the downwardly-forced envelope is just buoyantly supported, temporarily tethering the buoyant downwardly-forced envelope, removing the force, unbunching and extending said remainder of the envelope downwind from the tethered part of the envelope, attaching the load to the envelope, unclosing the upper intermediate portion, and untethering the envelope.

6. A method of weighing off and launching a balloon with a predetermined load and free lift, comprising the steps of temporarily choking closed an upper intermediate part of a gathered unloaded uninflated balloon envelope to provide thereabove a receptable for confining the inflation gas, assembling the remainder of the envelope in a compact mass below the receptacle, inflating the receptacle with lift gas, exerting on the bottom of the receptacle a downward force equal to the sum of the free lift and the weight of the load to be launched with the entire envelope, stopping the inflation when the envelope thus forced is just buoyantly supported, temporarily tethering the buoyant weighed-down envelope adjacent the bottom of the receptacle to prevent premature rise of the envelope on removal of the force, removing the force, extending said remainder of the envelope along the ground downwind from the receptacle, attaching the predetermined load to the envelope, unchoking the envelope, applying a temporary restraint against the upper side of the envelope adjacent the base of the receptacle, untethering the envelope, slowly accelerating the restraint downwind along the envelope to initiate gradual launching rise of the receptacle to its climbing velocity, and removing the restraint when the receptacle attains its climbing velocity.

7. In a structure of the class described, a balloon film envelope, means temporarily closing an intermediate part of the envelope to provide an inflation gas receptacle above the closing means, an inflation tube attached to the receptacle, a pouch in which the envelope below the closing means is packed, means temporarily suspending the pouch and contents from the closing means, and weight means temporarily suspended from and proximate to the closing means, the combined weight of the closing means, weight means, pouch, and the means by which they are temporarily attached being substantially equal to the sum of the predetermined free lift and the predetermined weight of the load to be launched with the envelope.

8. In a structure of the class described, a balloon film envelope, means closing an intermediate part of the envelope to provide above the closing means a receptacle for inflation gas, said means comprising an envelope-film-protecting sheet wrapped in tubular form about the envelope and secured in the shape of a loop for suspending a temporary load, a pouch in which the envelope below the loop is packed, dummy weight means, and means suspending the pouch, the part of the envelope therein, and the dummy weight means from the loop, the combined weight of the sheet, weight means, and pouch being substantially equal to the sum of the predetermined free lift and the predetermined weight of the load to be launched with the envelope.

9. In a structure of the class described, a high altitude balloon film envelope, releasable means closing an intermediate tubular part of the envelope to block flow of gas through said part and provide thereabove an inflation gas receptacle, and an inflation tube having an upper portion attached to and communicating with the receptacle at a place substantially above said part and extending outside the envelope from said place and having a lower open end outside the envelope for the intake of inflation gas.

References Cited in the file of this patent
UNITED STATES PATENTS

| | | |
|---|---|---|
| 2,635,834 | Huch | Apr. 21, 1953 |
| 2,635,835 | Dungan et al. | Apr. 21, 1953 |
| 2,708,082 | Moore | Aug. 10, 1955 |
| 2,758,804 | Hakomaki | Aug. 14, 1956 |
| 2,764,369 | Melton | Sept. 25, 1956 |